United States Patent [19]
Hirs et al.

[11] Patent Number: 5,504,618
[45] Date of Patent: Apr. 2, 1996

[54] EXTREME WIDE ANGLE, VERY LARGE APERTURE, COMPACT, UV IMAGING LENS

[75] Inventors: John H. Hirs, Winchester; Anthony M. Nicoli, Chelmsford; Warren L. Clark, Billerica, all of Mass.

[73] Assignee: Loral Infrared & Imaging Systems, Inc., Lexington, Mass.

[21] Appl. No.: 262,882

[22] Filed: Jun. 20, 1994

[51] Int. Cl.$^6$ .............................. G02B 13/14; G02B 3/00
[52] U.S. Cl. .................. 359/355; 359/350; 359/361; 359/722; 359/723; 359/783
[58] Field of Search .................... 359/355, 361, 359/722, 723, 754, 755, 756, 761, 763, 770, 771, 783, 350, 351, 354; 354/195.1, 195.12, 286

[56] References Cited

U.S. PATENT DOCUMENTS

| | | | |
|---|---|---|---|
| 3,802,765 | 4/1974 | Vuijk | 359/759 |
| 3,884,556 | 5/1975 | Nakagawa | 359/750 |
| 4,145,116 | 3/1979 | Ikeda | 359/749 |
| 4,394,073 | 7/1983 | Wakamiya | 359/753 |
| 4,554,447 | 11/1985 | Howard et al. | 250/216 |
| 5,168,351 | 12/1992 | Bradley et al. | 348/780 |
| 5,249,076 | 9/1993 | Fujiwara et al. | 359/350 |

FOREIGN PATENT DOCUMENTS 873194  10/1981  U.S.S.R. .

*Primary Examiner*—Martin Lerner
*Assistant Examiner*—Darren E. Schuberg
*Attorney, Agent, or Firm*—Leone & Moffa

[57] ABSTRACT

An extreme wide angle, very large aperture, very compact, solar blind, UV imaging lens system. The lens system has a fused silica polyvinyl alcohol glass color filter, a lens made of fused silica, a lens made of nickel sulfate, a layer of coupling fluid and another lens made of fused silica. Alternatively, sapphire can be used after the color filter instead of the fused silica. An alternative lens is composed of two layers of fused silica, a layer of nickel sulfate, another layer of fused silica, coupling fluid followed by polyvinyl alcohol, a color glass filter and coupling fluid followed by fused silica. In a fourth embodiment, the two layers of fused silica are followed by polyvinyl alcohol, a layer of colored glass filter, fused silica, nickel sulfate, coupling fluid, and fused silica.

14 Claims, 4 Drawing Sheets

EXTREME WIDE ANGLE, VERY LARGE APERTURE, COMPACT, UV IMAGING LENS

The invention relates to a lens system and more particularly to a six element imaging lens that provides an extremely wide angle field of view with a large aperture. In one particular embodiment, the lens is very compact for imaging of targets in the ultraviolet region.

BACKGROUND OF THE INVENTION

Various known lens systems exhibit a large field of view. For example, U.S. Pat. No. 3,884,556, to Jihei Nakagawa, entitled "Retrofocus Wide-Angle Lens System," describes a compact retrofocus wide-angle lens system in which aberrations are corrected using a positive meniscus lens with a large power as the first lens, negative meniscus lenses as second and third lenses, and a thick positive lens as a fourth lens.

U.S. Pat. No. 4,145,116, to Yoshitsugi Ikeda, entitled "Large Aperture Ultra Wide Angle Photographic Lens System," describes a large aperture ultra-wide angle photographic lens system with a lens diameter small enough to be compatible with filters designed for use with other lens systems, and which permits the correction of various optical aberrations.

U.S. Pat. No. 4,394,073, to Koichi Wakamiya, entitled "Compact Wide Angle Lens," discloses a compact wide angle lens comprising, in succession from the object side, a first component which is a positive meniscus lens having its convex surface facing the object side, a second component which is a biconcave lens, a third component which is a positive lens having its surface of sharper curvature facing the object side, a fourth component which is a positive lens, and a fifth component which is a negative meniscus lens having its convex surface facing the image side. The compact wide-angle lens has a total length as short as the focal length thereof, and yet has a small rearward lens aperture.

Nakagawa provides a compact retrofocus wide-angle lens system. Ikeda discloses a large aperture ultra-wide-angle photographic lens system. Wakamiya discloses a compact wide angle lens system comprising a series of lenses. Nakagawa, Ikeda, and Wakamiya all relate to the use of wide angle lenses to correct for aberrations, or to allow for more compact camera designs.

Now, for the first time and in contrast to the prior art, the present invention teaches the design of a single UV imaging lens package capable of detecting a target to within 9° using an extremely wide angle, very large aperture, and compact solar blind lens.

SUMMARY OF THE INVENTION

A lens system is provided including an extremely wide angle, very large aperture, compact, ultra-violet imaging lens. A lens made in accordance with the present invention may also be made solar blind. In one example, the length and diameter of the lens is about 5.4×4 inches, and the diagonal of the square image plane is 40 mm. The lens is provided in four embodiments, each embodiment comprised of a number of sub-lens elements made of varying materials including fused silica, polyvinyl alcohol, color glass filter, and nickel sulfate. The lens system further comprised filter elements that combine to make the lens system blind in the solar band region.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

DETAILED DESCRIPTION OF THE PREFERRED EMBODIMENT

Figure 1:
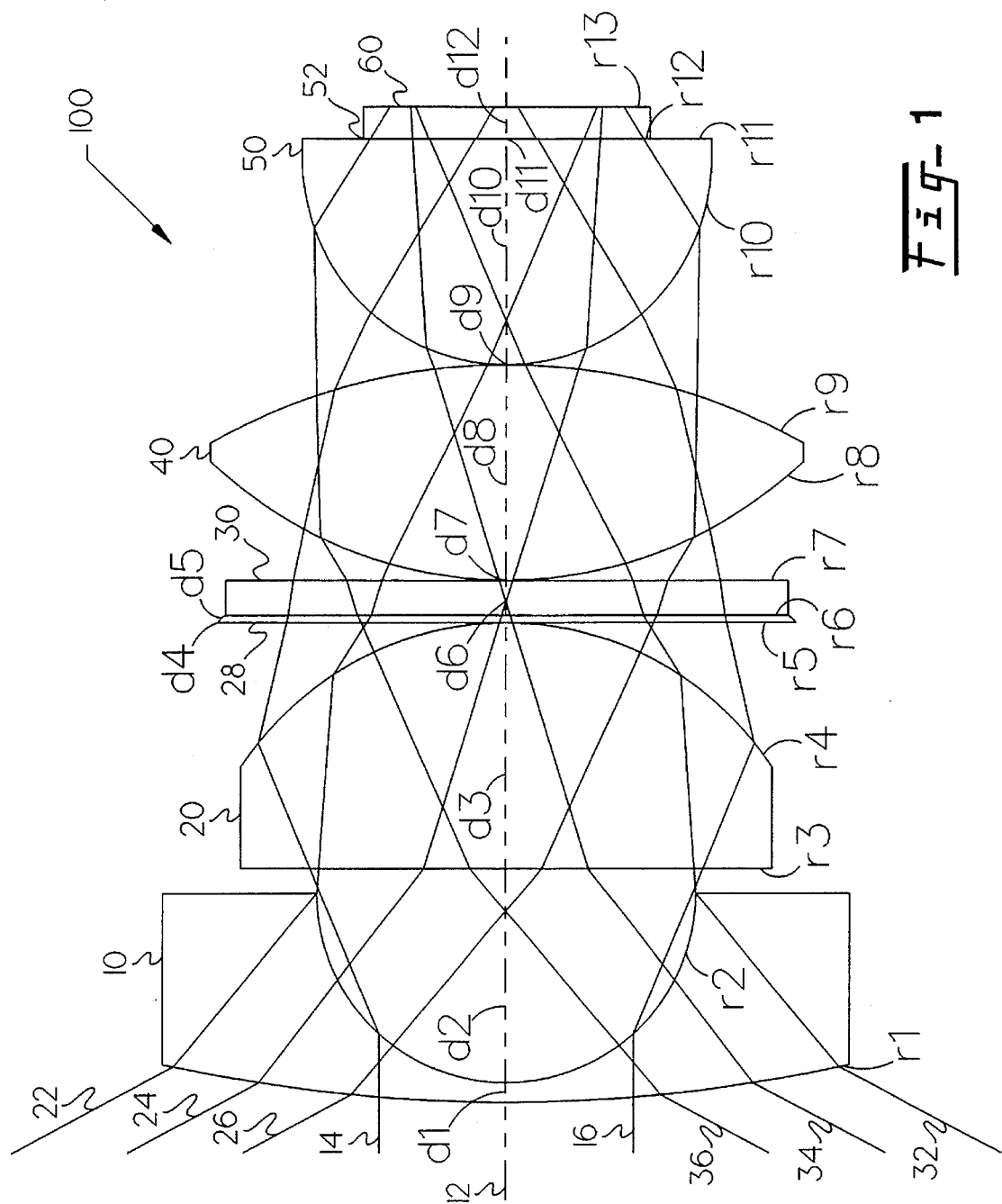
FIG. 1 shows a lens schematic of one embodiment of the invention.

FIG. 1 shows one embodiment of the imaging lens system of the invention. While the invention is described hereinbelow with reference to a specific example embodiment, it will be understood that this is done for illustrative purposes and that the invention is not limited by this description. First lens 10 serves as the entrance lens of the lens system 100. The field of view of the lens system 100 extends from optical ray 22 through optical ray 32. The optical axis is indicated by axis line 12. The lens system 100 comprises five lens and filter elements, a number of intermediate layers serving various optical functions, and a detector window 60. First lens 10 has a first radius of about 7.845 inches and a second radius of about 1.102 inches with a thickness through the optical center of about 0.12 inches. First lens 10 is comprised of fused silica and exhibits an index of refraction related to the sodium D-line of about 1.4584.

The next element, second lens 20, may have a first radius of about −38.4 inches and a second radius of about −1.765 inches. Second lens 20 may further be constructed to have a thickness through the optical center of about 1.47 inches. The second lens 20 also may be comprised substantially of fused silica. Optical element 28 is made of polyvinyl alcohol with 2,3-DIHYDRO-5,7-DIMETHYL-1-H-1,4-DIAZEPINE PERCHLORATE and 6-CHLORO-2,3-DIHYDRO-5,7-DIMETHYL-1-H-1,4-DIAZEPINE PERCHLORATE. Optical element 28 may be attached to third lens 30. Third lens 30 may substantially comprise colored filter glass as, for example, Hoya UH 330 which is available from Hoya Optics, Inc. of California.

Fourth lens 40 is next in the optical train with a first radius of about 2.565 inches, a second radius of about −4.59 inches and a diameter through the optic center of about 1.075 inches. The fourth lens 40 may also be comprised substantially of fused silica. The fifth lens 50 may be substantially comprised of nickel sulfate, hexahydrate, and have a first radius of about 1.285 inches and a second radius of infinity. The fifth lens 50 may advantageously be optically coupled to a fused silica window 60 with a coupling fluid 52. In one preferred embodiment, the coupling fluid may comprise FC 70, a flourinert electronic liquid available from 3M Corporation of St. Paul, Minn., U.S.A.

As shown in FIG. 1, a first group of rays 22, 24, 26 are parallel to each other and incident upon the top portion of the leading edge of the negative meniscus lens, first lens 10. Likewise, a second group of rays 32, 34, 36 are incident upon the bottom portion of the leading edge of the first lens 10. The rays pass through the lenses 10, 20, 30, 40, 50 and optical element 28 to window 60. Lenses 10, 20, 30, 40 and 50 operate so that the first group of rays 22, 24, 26 strike the bottom portion of window 60. Likewise, the second group of rays 32, 34, 36 strike the top portion of window 60. A third group of rays 14, 16 are parallel to axis line 12. Rays 14, 16 converge toward the center portion of window 60.

The lens system 100 of FIG. 1 provides a blur spot at the exit that varies with field angle. In one preferred embodiment of the invention, as the field angle varies from the optical axis, the blur spot varies from about 18° to 9°.

The lens system 100 provides an extremely wide field of view (±60°), a large aperture, a compact size, and an optically solar blind design. The invention also provides UV imaging and transmits directional information of a target to within 9°, and blur circle uniformity. The compact lens system 100 is achieved in part by limiting the number of optical elements to five, only four of which are powered. In one useful embodiment, the length and diameter of the optical design is 5.4 by 4.0 inches and the focal or image plane is a square having a diagonal of 40 mm.

The lens system 100 operates in the ultraviolet (UV) region, a difficult spectral region to work in due to limited optical materials that have useful Uv spectral characteristics. Due to the compact size, extreme Field of View (FOV), and large aperture, the optical design does not form a sharp image as is typical for a photographic lens design.

Table 1 depicts the dimensions for the preferred dimensions of embodiment 1 of the present invention. As shown in FIG. 1, r represents the radius of curvature for the given side of an element; d indicates distance, which is either the thickness of an element, or the separation between elements. In addition, Table 1 sets forth the index of refraction, $n_d$, in conjunction with the preferred material composition of each lens.

TABLE 1

| 120° = Field of View | | 9° to 18° = Blur Spot Size |
|---|---|---|
| 1.40" = Aperture | | focal length = 0.795" |
| 5.4" = Length | | F/# = 0.568 |
| 4.0" = Diameter | | |
| Formula 1: | 2,3-DIHYDRO-5,7-DIMETHYL-1-H-1,4-DIAZEPINE PERCHLORATE | |
| Formula 2: | 6-CHLORO-2,3-DIHYDRO-5,7-DIMETHYL-1-H-1,4-DIAZEPINE PERCHLORATE | |

| | | | |
|---|---|---|---|
| r1 = 7.845 | | | |
| | d1 = 0.12 | $n_d1$ = 1.4584 | Fused Silica |
| r2 = 1.102 | | | |
| | d2 = 1.124 | | |
| r3 = −38.4 | | | |
| | d3 = 1.47 | $n_d2$ = 1.4584 | Fused Silica |
| r4 = −1.765 | | | |
| | d4 = 0.020 | | |
| r5 = ∞ | | | |
| | d5 = 0.004 | $n_d3$ = 1.48 | Polyvinyl Alcohol (with Formula 1, Formula 2) |
| r6 = ∞ | | | |
| | d6 = 0.3 | $n_d4$ = 1.54 | Color Filter Glass (Hoya UH–330) |
| r7 = ∞ | | | |
| | d7 = 0.020 | | |
| r8 = 2.565 | | | |
| | d8 = 1.075 | $n_d5$ = 1.4584 | Fused Silica |

TABLE 1-continued

| | | | |
|---|---|---|---|
| r9 = −4.59 | | | |
| | d9 = 0.020 | | |
| r10 = 1.285 | | | |
| | d10 = 1.24 | $n_d6$ = 1.51 | Nickel Sulfate $(NiSO_4(H_2O)_6)$ |
| r11 = ∞ | | | |
| | d11 = 0.010 | $n_d7$ = 1.3 | Coupling Fluid (FC 70) |
| r12 = ∞ | | | |
| | d12 = 0.197 | $n_d8$ = 1.4584 | Fused Silica |
| r13 = ∞ | | | |

Figure 2:
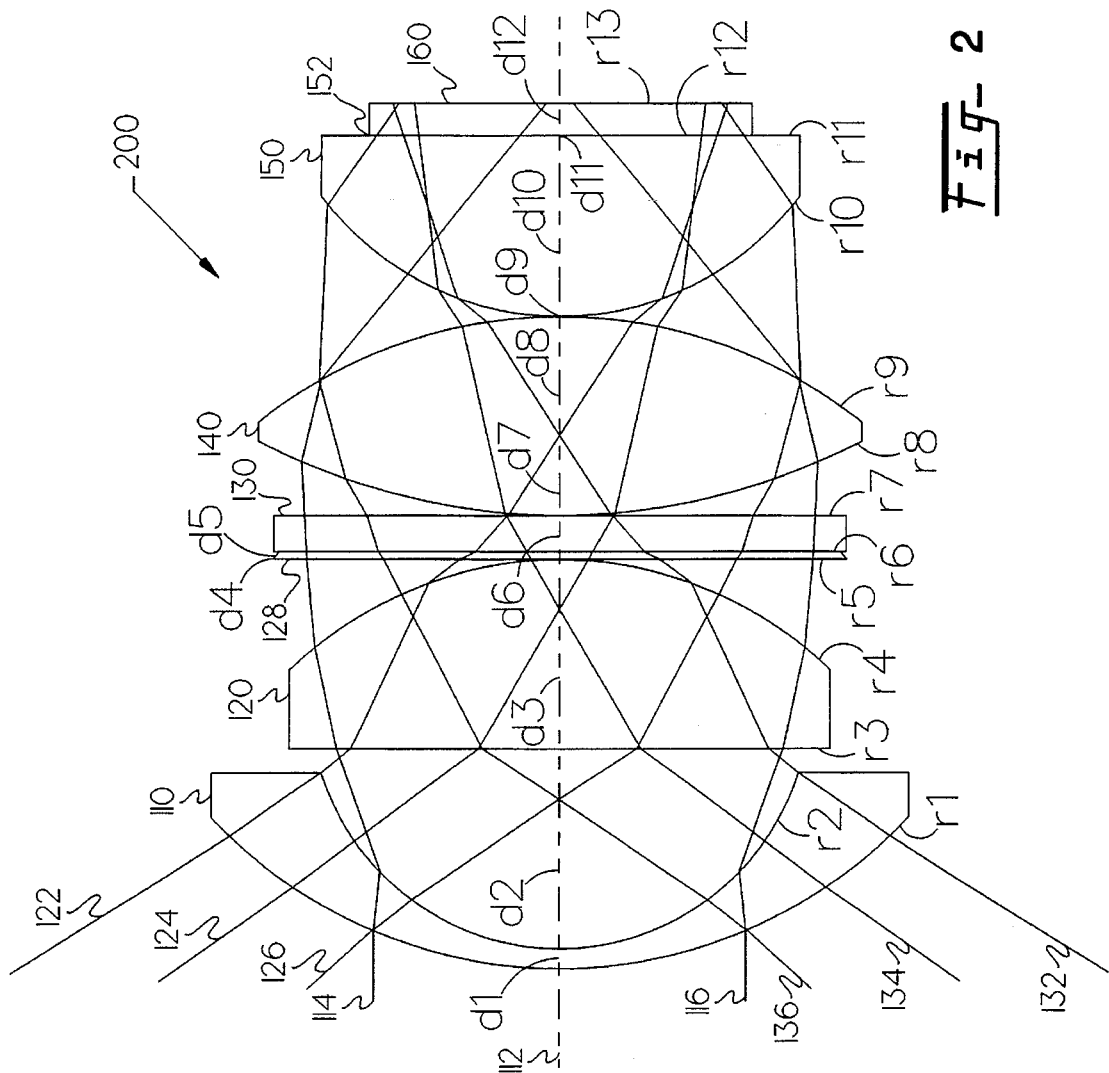
FIG. 2 shows a lens schematic of an alternative embodiment of the invention.

FIG. 2 shows an alternate embodiment of the imaging lens system of the invention. First lens 110 serves as the entrance lens of the lens system 200. The field of view of the lens system 200 extends from optical ray 122 through optical ray 132. The optical axis is indicated by axis line 112. The lens system 200 comprises five lens and filter elements and a number of intermediate layers serving various optical functions. First lens 110 may advantageously have a first radius of about 2.65 inches and a second radius of about 1.02 inches with a thickness through the optical center of about 0.12 inches. First lens 110 is comprised of fused silica and has an index of refraction related to the sodium D-line of 1.4584.

The next element, second lens 120, has a first radius of about −22.2 inches and a second radius of about −1.89 inches. It may have a thickness through the optical center of about 0.795 inches and be comprised substantially of fused silica. Optical element 128 may comprise polyvinyl alcohol and may be attached to third lens 130 which is comprised of colored filter glass (Hoya UH 330). Fourth lens 140 is next in the optical train with a first radius of about 4.305 inches, a second radius of about −2.873 inches and a diameter through the optic center of about 0.792 inches.

The fourth lens 140 may also be comprised substantially of sapphire. The fifth lens 150 may be comprised of nickel sulfate and have a first radius of about 1.34 inches and a second radius of infinity. In this example, it is optically coupled to a fused silica window 160 with coupling fluid 152.

As shown in FIG. 2, a first group of rays 122, 124, 126 are parallel to each other and incident upon the top portion of the leading edge of the negative meniscus lens, first lens 110. Likewise, a second group of rays 132, 134, 136 are incident upon the bottom portion of the leading edge of the first lens 110.

The rays pass through the lenses 110, 120, 130, 140, 150 and optical element 128 to window 160. As in FIG. 1, lenses 110, 120, 130, 140 and 150 operate so that the first group of rays 122, 124, 126 strike the bottom portion of window 160. Likewise, the second group of rays 132, 134, 136 strike the top portion of window 160. A third group of rays 114, 116 are parallel to axis line 112. Rays 114, 116 converge toward the center portion of window 160. However, unlike FIG. 1, the first and second groups of rays do not reach window 160 in the same order in which the rays are incident to lens 110. For instance, in the first group, ray 122 enters as the outermost ray and ray 124 enters as the middle ray. Yet, at window 160, ray 122 is the outermost ray, and ray 124 is the innermost ray of the first group.

The lens system 200 of FIG. 2 provides a blur spot at the exit that varies with field angle. In one preferred embodiment of the invention, as the field angle varies from the optical axis, the blur spot varies from about 18° to 9°.

Similarly to the system of FIG. 1, the lens system 200 provides an extremely wide field of view (±60°), a large aperture, a compact size, and an optically solar blind design. It also provides UV imaging providing directional information of a target to within 9°, and blur circle uniformity within 2 to 1. Similarly, the compact lens system 200 is achieved in part by limiting the number of optical elements to five, only four of which are powered. In one example, the length and diameter of the optical design is 4.0 by 3.35 inches and the image plane is a square having a diagonal of 40 mm. The optical design incorporates several filtering elements. The total bandpass of all the elements combined make the system filter to within the desired predetermined spectral range, in this case ultraviolet.

Table 2 depicts the dimensions for the preferred dimensions of embodiment 2 of the present invention. As shown in FIG. 2, r represents the radius of curvature for the given side of an element, and d indicates distance, which is either the thickness of an element, or the separation between elements. In addition, Table 2 sets forth the index of refraction, $n_d$, in conjunction with the preferred material composition of each lens.

TABLE 2

| 120° = Field of View | 9° to 18° = Blur Spot Size | | |
|---|---|---|---|
| 1.45" = Aperture | focal length = 0.820 | | |
| 4.0" = Length | F/# = 0.566 | | |
| 3.35" = Diameter | | | |
| Formula 1: | 2,3-DIHYDRO-5,7-DIMETHYL-1-H-1,4-DIAZEPINE PERCHLORATE | | |
| Formula 2: | 6-CHLORO-2,3-DIHYDRO-5,7-DIMETHYL-1-H-1,4-DIAZEPINE PERCHLORATE | | |
| r1 = 2.65 | | | |
| | d1 = 0.12 | $n_d1$ = 1.4584 | Fused Silica |
| r2 = 1.02 | | | |
| | d2 = 0.912 | | |
| r3 = −22.2 | | | |
| | d3 = 0.795 | $n_d2$ = 1.4584 | Fused Silica |
| r4 = −1.89 | | | |
| | d4 = 0.020 | | |
| r5 = ∞ | | | |
| | d5 = 0.004 | $n_d3$ = 1.48 | Polyvinyl Alcohol (with Formula 1, Formula 2) |
| r6 = ∞ | | | |
| | d6 = 0.3 | $n_d4$ = 1.54 | Color Filter Glass (Hoya UH-330) |
| r7 = ∞ | | | |
| | d7 = 0.020 | | |
| r8 = 4.305 | | | |
| | d8 = 0.792 | $n_d5$ = 1.768 | Sapphire |
| r9 = −2.873 | | | |
| | d9 = 0.020 | | |
| r10 = 1.34 | | | |
| | d10 = 1.007 | $n_d 6$ = 1.51 | Nickel Sulfate $(NiSO_4(H_2O)_6)$ |
| r11 = ∞ | | | |
| | d11 = 0.010 | $n_d7$ = 1.3 | Coupling Fluid (FC 70) |
| r12 = ∞ | | | |
| | d12 = 0.236 | $n_d8$ = 1.4584 | Fused Silica |
| r13 = ∞ | | | |

Figure 3:
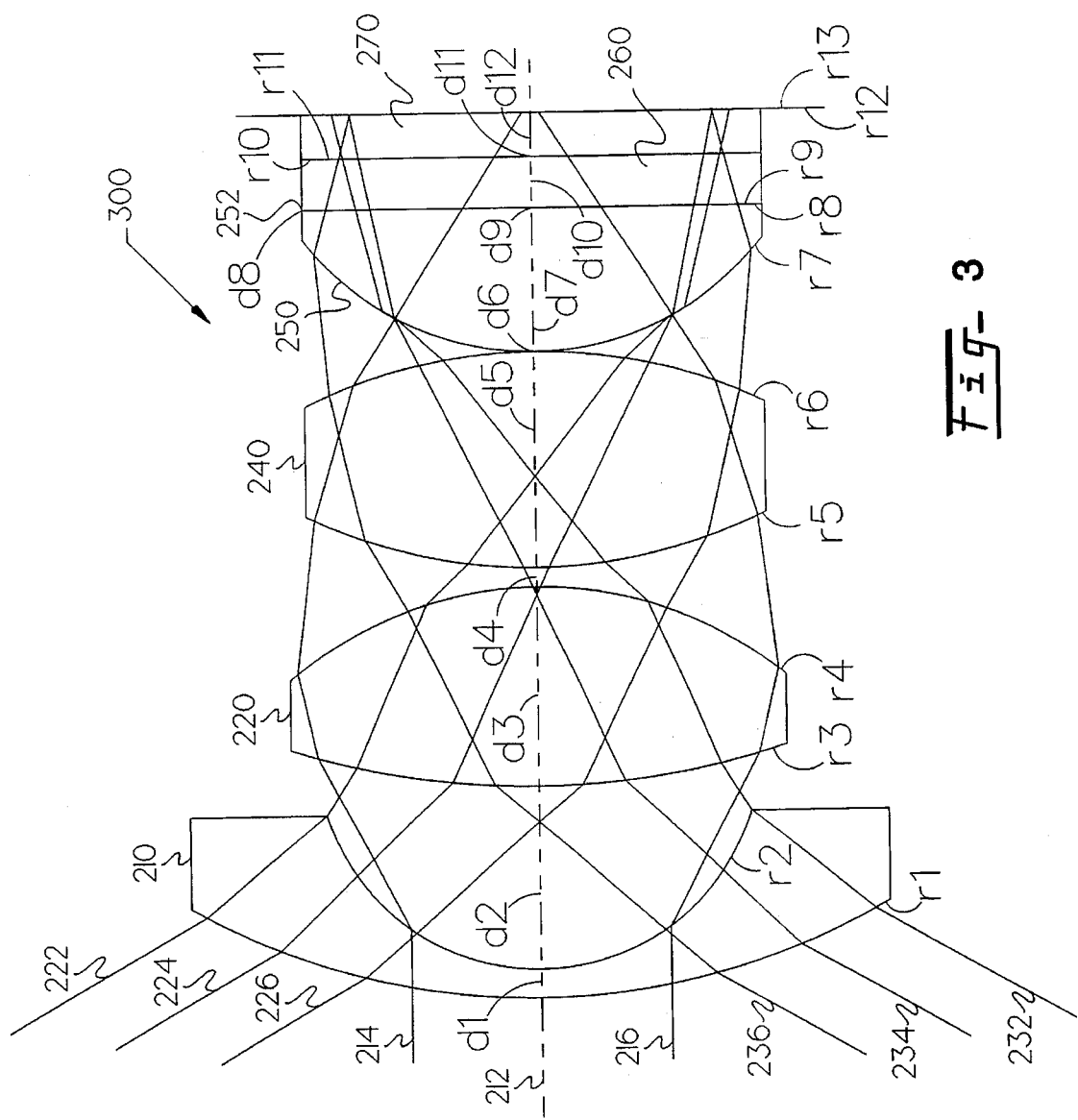
FIG. 3 shows a lens schematic of yet another alternative embodiment of the invention.

FIG. 3 shows another alternate embodiment of the imaging lens system of the invention which functions similarly to the system of FIG. 1. First lens 210 serves as the entrance lens of the lens system 300. The field of view of the lens system 300 extends from optical ray 222 through optical ray 232. The optical axis is indicated by axis line 212. The lens system 300 comprises five lens and filter elements and a number of intermediate layers serving various optical functions. First lens 210 may have a first radius of about 3.3913 inches and a second radius of about 0.9045 inches with a thickness through the optical center of about 0.162 inches. First lens 210 may advantageously be comprised of fused silica and have an index of refraction related to the sodium D-line of about 1.4584.

The next element, second lens 220, may have a first radius of about 4.1921 inches and a second radius of −1.6542 inches. It may have a thickness through the optical center of about 0.8157 inches and be comprised substantially of fused silica. Third lens 240 is next in the optical train and may have a first radius of about 2.636 inches, a second radius of about −2.636 inches and a diameter through the optic center of 0.985 inches. The third lens 240 may also be comprised substantially of nickel sulfate.

The fourth lens 250 may comprise substantially fused silica and have a first radius of 1.254 inches and a second radius of infinity. Optical element 252 may comprise polyvinyl alcohol and may be attached to fifth lens 260 which is comprised of colored filter glass (Hoya UH 330). Fifth lens 260 and attached optical element 252 may be coupled to fourth lens 250 with coupling fluid.

As shown in FIG. 3, a first group of rays 222, 224, 226 are parallel to each other and incident upon the top portion of the leading edge of the negative meniscus lens, first lens 210. Likewise, a second group of rays 232, 234, 236 are incident upon the bottom portion of the leading edge of the first lens 210.

The rays pass through the lenses 210, 220, 240, 250 and 260 to window 270. As in FIG. 1, lenses 210, 220, 240, 250 and 260 operate so that the first group of rays 222, 224, 226 strike the bottom portion of window 270. Likewise, the second group of rays 232, 234, 236 strike the top portion of window 270. A third group of rays 214, 216 are parallel to axis line 212. Rays 214, 216 converge toward the center portion of window 270. However, unlike FIG. 1, the first and second groups of rays do not reach window 270 in the same order in which the rays are incident to lens 210. For instance, in the first group, ray 222 enters as the outermost ray and ray 224 enters as the middle ray. Yet, at window 270, ray 222 is the outermost ray, and ray 224 converges with 226 to form the innermost rays of the first group.

The lens system 300 of FIG. 3 provides a blur spot at the exit that varies with field angle. In one preferred embodiment of the invention, as the field angle varies from the optical axis, the blur spot varies from about 18° to 9°.

Table 3 depicts the dimensions for the preferred dimensions of embodiment 3 of the present invention. As shown in FIG. 3, r represents the radius of curvature for the given side of an element, and d indicates distance, which is either the thickness of an element, or the separation between elements. In addition, Table 3 sets forth the index of refraction, $n_d$, in conjunction with the preferred material composition of each lens.

TABLE 3

| 120° = Field of View | 9° to 18° = Blur Spot Size |
|---|---|
| 1.2" = Aperture | focal length = 0.828 |
| 4.0" = Length | F/# = 0.690 |
| 3.2" = Diameter | |
| Formula 1: | 2,3-DIHYDRO-5,7-DIMETHYL-1-H-1,4-DIAZEPINE PERCHLORATE |
| Formula 2: | 6-CHLORO-2,3-DIHYDRO-5,7-DIMETHYL-1-H-1,4-DIAZEPINE PERCHLORATE |

TABLE 3-continued

| | | | |
|---|---|---|---|
| r1 = 3.3913 | | | |
| | d1 = 0.162 | $n_d1$ = 1.4584 | Fused Silica |
| r2 = 0.9045 | | | |
| | d2 = 0.925 | | |
| r3 = 4.1921 | | | |
| | d3 = 0.8157 | $n_d2$ = 1.4584 | Fused Silica |
| r4 = −1.6542 | | | |
| | d4 = 0.070 | | |
| r5 = 2.636 | | | |
| | d5 = 0.985 | $n_d3$ = 1.51 | Nickel Sulfate ($NiSO_4(H_2O)_6$) |
| r6 = −2.636 | | | |
| | d6 = 0.020 | | |
| r7 = 1.254 | | | |
| | d7 = 0.6218 | $n_d4$ = 1.4584 | Fused Silica |
| r8 = ∞ | | | |
| | d8 = 0.010 | $n_d5$ = 1.3 | Coupling Fluid (FC 70) |
| r9 = ∞ | | | |
| | d9 = 0.004 | $n_d6$ = 1.48 | Polyvinyl Alcohol (with Formula 1, Formula 2) |
| r10 = ∞ | | | |
| | d10 = 0.3202 | $n_d7$ = 1.54 | Color Filter Glass (Hoya UH-330) |
| r11 = ∞ | | | |
| | d11 = 0.013 | $n_d8$ = 1.3 | Coupling Fluid (FC 70) |
| r12 = ∞ | | | |
| | d12 = 0.22 | $n_d9$ = 1.4584 | Fused Silica |
| r13 = ∞ | | | |

Figure 4:
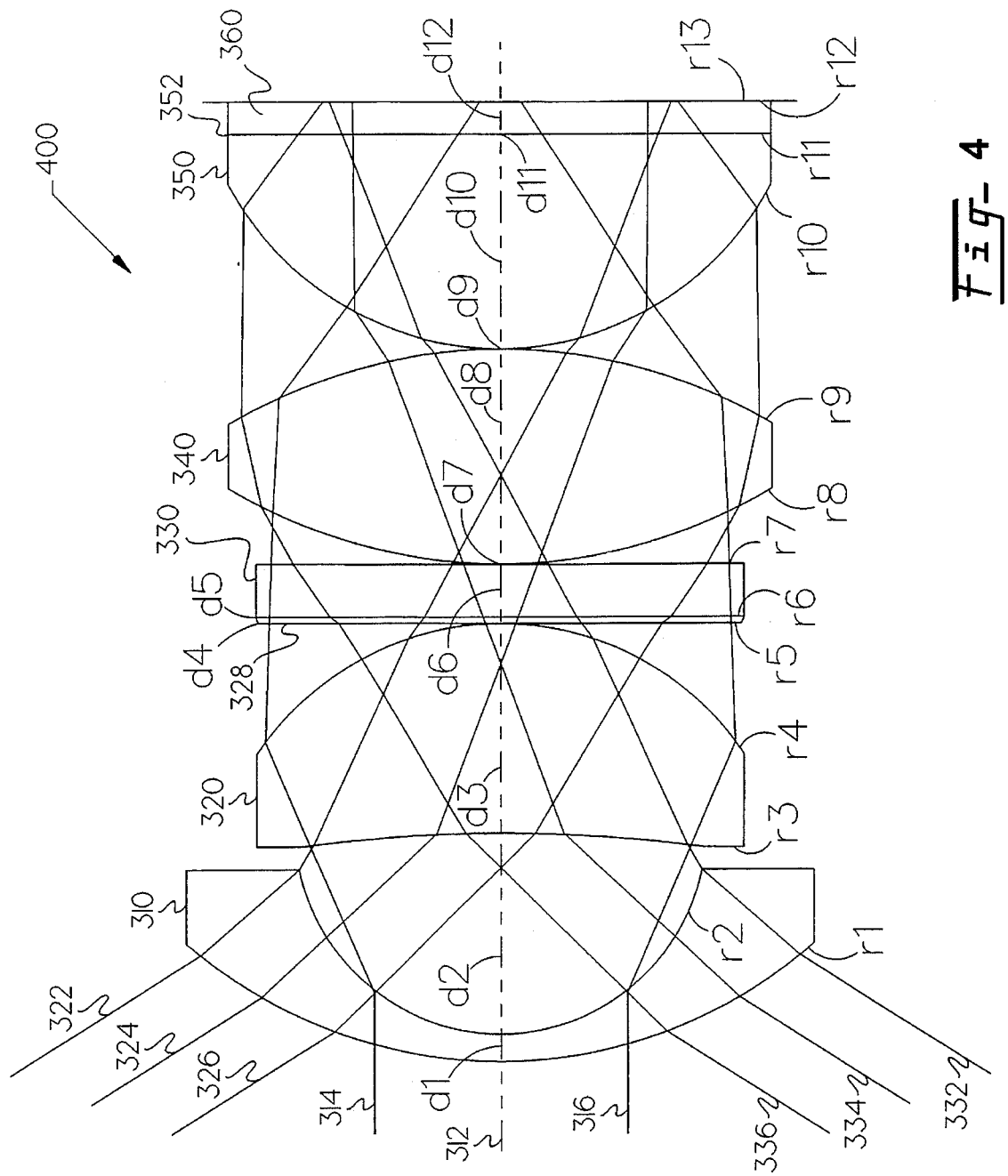
FIG. 4 shows a lens schematic of a further embodiment of the invention.

FIG. 4 shows yet another alternate embodiment of the imaging lens system of the invention which also functions similarly to the system in FIG. 1. First lens 310 serves as the entrance lens of the lens system 400. The field of view of the lens system 300 extends from optical ray 322 through optical ray 332. The optical axis is indicated by axis line 312. The lens system 400 comprises five lens and filter elements and a number of intermediate layers serving various optical functions. First lens 310 may have a first radius of about 2.68 inches and a second radius of about 0.922 inches with a thickness through the optical center of about 0.12 inches. First lens 310 may be comprised of fused silica and have an index of refraction related to the sodium D-line of 1.4584.

The next element in this example, second lens 320, may have a first radius of about −6.025 inches and a second radius of about −1.427 inches. It may have a thickness through the optical center of about 1.045 inches and also be made substantially of fused silica. Optical element 328 comprises polyvinyl alcohol and may be attached to third lens 330 made of colored filter glass.

Fourth lens 340 is next in the optical train and may have a first radius of about 2.611 inches, a second radius of about −2.611 inches and a diameter through the optic center of about 0.89 inches. The fourth lens 340 may also be comprised of fused silica. The fifth lens 350 may advantageously be made of nickel sulfate and have a first radius of 1.27 inches and a second radius of infinity. It may be optically coupled to a fused silica window 360 with coupling fluid 352.

As shown in FIG. 4, a first group of rays 322, 324, 326 are parallel to each other and incident upon the top portion of the leading edge of the negative meniscus lens, first lens 310. Likewise, a second group of rays 332, 334, 336 are incident upon the bottom portion of the leading edge of the first lens 310.

The rays pass through the lenses 310, 320, 330, 340 and 350 to window 360. As in FIG. 1, lenses 310, 320, 330, 340 and 350 operate so that the first group of rays 322, 324, 326 strike the bottom portion of window 360. Likewise, the second group of rays 332, 334, 336 strike the top portion of window 360. A third group of rays 314, 316 are parallel to axis line 312. Rays 314, 316 converge toward the center portion of window 360. However, unlike FIG. 1, the first and second groups of rays do not reach window 360 in the same order in which the rays are incident to lens 310. For instance, in the first group, ray 322 enters as the outermost ray and ray 324 enters as the middle ray. Yet, at window 360, ray 322 is the middle ray, and ray 324 is the innermost ray of the first group.

The lens system 400 of FIG. 4 provides a blur spot at the exit that varies with field angle. In one preferred embodiment of the invention, as the field angle varies from the optical axis, the blur spot varies from about 18° to 9°.

Table 4 depicts the dimensions for the preferred dimensions of embodiment 4 of the present invention. As shown in FIG. 4, r represents the radius of curvature for the given side of an element, and d indicates distance, which is either the thickness of an element, or the separation between elements. In addition, Table 4 sets forth the index of refraction, $n_d$, in conjunction with the preferred material composition of each lens.

TABLE 4

| | |
|---|---|
| 120° = Field of View | 9° to 18° = Blur Spot Size |
| 1.25" = Aperture | focal length = 0.785 |
| 4.45" = Length | F/# = 0.628 |
| 3.1" = Diameter | |
| Formula 1: | 2,3-DIHYDRO-5,7-DIMETHYL-1-H-1,4-DIAZEPINE PERCHLORATE |
| Formula 2: | 6-CHLORO-2,3-DIHYDRO-5,7-DIMETHYL-1-H-1,4-DIAZEPINE PERCHLORATE |

| | | | |
|---|---|---|---|
| r1 = 2.68 | | | |
| | d1 = 0.12 | $n_d1$ = 1.4584 | Fused Silica |
| r2 = 0.922 | | | |
| | d2 = 0.953 | | |
| r3 = −6.025 | | | |
| | d3 = 1.045 | $n_d2$ = 1.4584 | Fused Silica |
| r4 = −1.427 | | | |
| | d4 = 0.020 | | |
| r5 = ∞ | | | |
| | d5 = 0.004 | $n_d3$ = 1.48 | Polyvinyl Alcohol (with Formula 1, Formula 2) |
| r6 = ∞ | | | |
| | d6 = 0.3 | $n_d4$ = 1.54 | Color Filter Glass (Hoya UH-330) |
| r7 = ∞ | | | |
| | d7 = 0.020 | | |
| r8 = 2.611 | | | |
| | d8 = 0.89 | $n_d5$ = 1.4584 | Fused Silica |
| r9 = −2.611 | | | |
| | d9 = 0.020 | | |
| r10 = 1.27 | | | |
| | d10 = 1.07 | $n_d6$ = 1.51 | Nickel Sulfate ($NiSO_4(H_2O)_6$) |
| r11 = ∞ | | | |
| | d11 = 0.010 | $n_d7$ = 1.3 | Coupling Fluid (FC 70) |
| r12 = ∞ | | | |
| | d12 = 0.197 | $n_d8$ = 1.4584 | Fused Silica |
| r13 = ∞ | | | |

Nominal bundle of light that reaches the detector for each optical lens system or embodiment on-axis. This diameter varies for each of the four embodiments. The amount of energy reaching each detector on-axis, excluding the filter material absorption, is proportional to the area or square-of-the-diameter of the bundle of light, i.e. for embodiment 1 the aperture diameter is about 1.40 inches. Therefore, the area is $\pi r^2$ or $\pi(0.70 \text{ inches})^2$ or $1.54(\text{inches})^2$. The area of embodiment 4 is $\pi(1.25/2 \text{ in})^2$ or $1.23 \text{ inches}^2$. The significance of these aperture sizes are realized when other extreme wide angle lens systems are found to have aperture diameters of only 0.1 to 0.2 inches. Their areas of light energy are then 0.03 to 0.13 inches. It is therefore evident that the various embodiments of the invention transmit 10 to 50 times more energy on-axis before filtering than other typical extreme wide angle systems.

The nominal area of light energy varies with field angle. The area is $\pi r^2 \cos\theta$ where r is the radius of the on-axis aperture and $\Theta$ is the field angle. The cosine-theta effect occurs because the projection of the area of the lens system aperture decreases as the field angle is increased. The before-filtering area of light energy at 60° will be half ($\cos 60° = 0.5$) that of the on-axis area.

Those skilled in the art will recognize that prior art wide angle systems have vignetting at off-axis field angles. These losses are additional to the cosine-theta effect losses. The four embodiments discussed above have zero to minimal vignetting, limiting the off-axis losses to cos e above.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A lens system comprising:
   (a) an optical housing; and
   (b) a plurality of optical elements mounted on the optical housing wherein the plurality of optical elements cooperate to transmit radiation only in a predetermined ultraviolet band and provide a compact lens system having a wide field of view with an F/# less than 1 wherein the compact lens system further comprises a square image plane having a diagonal of at least 40 mm.

2. The lens system of claim 1 wherein the compact lens system has an overall length of no more than 6.0 inches and an overall diameter of no more than 4 inches with a blur spot size ranging from 9 degrees to 18 degrees.

3. The lens system of claim 1 wherein the compact lens system has an overall length of no more than 4.5 inches, an overall diameter of no more than 4 inches with a blur spot size ranging from 9 degrees to 18 degrees and a field of view greater than 92 degrees.

4. The lens system of claim 1 wherein:
   (a) the optical housing further comprises a first lens mount, a second lens mount, a first filter mount, a third lens mount, a fourth lens mount, and a window mount;
   (b) the plurality of optical elements comprises a first lens mounted to the first lens mount wherein the first lens has a first lens optical axis, a second lens mounted to the second lens mount wherein the second lens has a second lens optical axis substantially coincident with the first lens optical axis, a first filter mounted to the first filter mount wherein the first filter has a first filter optical axis substantially coincident with the first lens optical axis, and a third lens mounted to the third lens mount wherein the third lens has a third lens optical axis substantially coincident with the first lens optical axis, a fourth lens mounted to the fourth lens mount wherein the fourth lens has a fourth lens optical axis substantially coincident with the first lens optical axis, wherein each the first lens, second lens, first filter, third lens and fourth lens cooperates optically to provide extremely wide angle, very large aperture, compact, solar blind, ultra-violet imaging.

5. The lens system of claim 4 wherein the second lens comprises fused silica.

6. The lens system of claim 4 wherein the first filter comprises color filter glass coated with polyvinyl alcohol and 2,3-DIHYDRO-5,7-DIMETHYL-1-H-1,4-DIAZEPINE PERCHLORATE and 6-CHLORO-2,3-DIHYDRO-5,7-DIMETHYL-1-H 1,4-DIAZEPINE PERCHLORATE.

7. The lens system of claim 1 wherein the plurality of optical elements includes a filter comprising color filter glass coated with polyvinyl alcohol and 2,3-DIHYDRO-5,7-DIMETHYL-1-H-1,4-DIAZEPINE PERCHLORATE and 6-CHLORO-2,3-DIHYDRO-5,7-DIMETHYL-1-H-1,4-DIAZEPINE PERCHLORATE.

8. A lens system comprising:
   (a) a first lens, comprised of fused silica, having a first radius of curvature, $r1= 7.845$ inches, a second radius of curvature, $r2= 1.102$ inches, a first thickness, $d1= 0.12$ inches, and a first index of refraction, $n_d1= 1.4584$;
   (b) a second lens, comprising fused silica, having a third radius of curvature, $r3= -38.4$ inches, a fourth radius of curvature, $r4= -1.765$ inches, a second thickness, $d2= 1.47$ inches, and a second index of refraction, $n_d2= 1.4584$;
   (c) a film, comprising polyvinyl alcohol of 2,3-DIHYDRO-5,7-DIMETHYL-1-H-1,4-DIAZEPINE PERCHLORATE and 6-CHLORO-2,3-DIHYDRO-5,7-DIMETHYL-1-H-1,4-DIAZEPINE PERCHLORATE having a fifth radius of curvature, $r5=\infty$, a third thickness, $d3= 0.004$ inches, and a third index of refraction, $n_d3= 1.48$;
   (d) a third lens, comprising colored glass filter, having a sixth radius of curvature, $r6=\infty$, a seventh radius of curvature, $r7=\infty$, a fourth thickness, $d4= 0.3$ inches, and a fourth index of refraction, $n_d4= 1.54$;
   (e) a fourth lens, comprising fused silica, having an eighth radius of curvature, $r8= 2.565$ inches, an ninth radius of curvature, $r9= -4.59$ inches, a fifth thickness, $d5= 1.075$ inches, and a fifth index of refraction, $n_d5= 1.4584$;
   (f) a fifth lens, comprising nickel sulfate, having a tenth radius of curvature, $r10= 1.285$ inches, an eleventh radius of curvature, $r11=\infty$, a sixth thickness, $d6= 1.24$ inches, and a sixth index of refraction, $n_d6 = 1.51$;
   (g) a window, comprised of fused silica, having a twelfth radius of curvature, $r12=\infty$, a thirteenth radius of curvature, $r13=\infty$, a seventh thickness, $d7= 0.197$ inches, and a seventh index of refraction, $n_d7=1.4584$; and,
   wherein each of said first to twelfth radii of curvature is centered about an axis line and wherein the lens system further has an 120° field of view, a 9° to 18° blur spot size, 1.40 inch aperture, 0.795 inch focal length, 5.4 inch overall length, F/# of 0.568, 4.0 inch diameter.

9. A lens system comprising:
   (a) a first lens, comprised of fused silica, having a first radius of curvature, $r1= 2.65$ inches, a second radius of curvature, $r2= 1.02$ inches, a first thickness, $d1= 0.12$ inches, and a first index of refraction, $n_d1=1.4584$;
   (b) a second lens, comprising fused silica, having a third radius of curvature, $r3= -22.24$ inches, a fourth radius of curvature, r4=−1.89 inches, a second thickness, d2= 0.795 inches, and a second index of refraction, $n_d2$= 1.4584;

(c) a film, comprising polyvinyl alcohol of 2,3-DIHYDRO-5,7-DIMETHYL-1-H-1,4-DIAZEPINE PERCHLORATE and 6-CHLORO-2,3-DIHYDRO-5,7-DIMETHYL-1-H-1,4-DIAZEPINE PERCHLORATE having a fifth radius of curvature, r 5=∞, a third thickness, d3= 0.004 inches, and a third index of refraction, $n_d3$= 1.48;

(d) a third lens, comprising a colored glass filter, having a sixth radius of curvature, r6=∞, a seventh radius of curvature, r7= ∞, a fourth thickness, d4= 0.3 inches, and a fourth index of refraction, $n_d4$= 1.54;

(e) a fourth lens, comprising sapphire, having an eighth radius of curvature, r8= 4.305 inches, a ninth radius of curvature, r9= −2.873 inches, a fifth thickness, d5= 0.792 inches, and a fifth index of refraction, $n_d5$= 1.768;

(f) a fifth lens, comprising nickel sulfate, having a tenth radius of curvature, r10 = 1.34 inches, an eleventh radius of curvature, r11= ∞, a sixth thickness, d6= 1.007 inches, and a sixth index of refraction, $n_d6$= 1.51;

(g) a window, comprised of fused silica, having a twelfth radius of curvature, r12= ∞, a thirteenth radius of curvature, r13=∞, a seventh thickness, d7= 0.236 inches, and a seventh index of refraction, $n_d7$= 1.4584; and, wherein each of said first to twelfth radii of curvature is centered about an axis line and wherein the lens system further has an 120° field of view, a 9° to 18° blur spot size, 1.45 inch aperture, 0.820 inch focal length, 4.0 inch overall length, F/# of 0.566, and a 3.35 inch diameter.

10. An imaging lens system comprising:

(a) a first lens, comprised of fused silica, having a first radius of curvature, r1= 3.3913 inches, a second radius of curvature, r2= 0.9045 inches, a first thickness, d1= 0.162 inches, and a first index of refraction, $n_1$= 1.4584;

(b) a second lens, comprising fused silica, having a third radius of curvature, r3= 4.1921 inches, a fourth radius of curvature, r4=−1.6542 inches, a second thickness, d2= 0.8157 inches, and a second index of refraction, $n_d2$= 1.4584;

(c) a third lens, comprising nickel sulfate, having a fifth radius of curvature, r5= 2.636 inches, a sixth radius of curvature, r6= −2.636 inches, a third thickness, d3= 0.985 inches, and a third index of refraction, $n_d3$= 1.51;

(d) a fourth lens, comprising fused silica, having a seventh radius of curvature, r7= 1.254 inches, an eighth radius of curvature, r8=∞, a fourth thickness, d4= 0.6218 inches, and a fourth index of refraction, $n_4$ = 1.4584;

(e) a film, comprising polyvinyl alcohol of 2,3-DIHYDRO-5,7-DIMETHYL-1-H-1,4-DIAZEPINE PERCHLORATE and 6-CHLORO-2,3-DIHYDRO-5,7-DIMETHYL-1-H-1,4-DIAZEPINE PERCHLORATE having a ninth radius of curvature, r9=∞, a fifth thickness, d5=0.004 inches, and a fifth index of refraction, $n_d5$= 1.48;

(f) a fifth lens, comprising a colored glass filter, having a tenth radius of curvature, r10= ∞, an eleventh radius of curvature, r11= ∞, a sixth thickness, d6= 0.3202 inches, and a sixth index of refraction, $n_d6$= 1.54;

(g) a window, comprised of fused silica, having a twelfth radius of curvature, r12=∞, a thirteenth radius of curvature, r13=∞, a seventh thickness, d7= 0.22 inches, and a seventh index of refraction, $n_d7$= 1.4584; and, wherein each of said first to twelfth radii of curvature is centered about an axis line and wherein the lens system further has an 120° field of view, a 9° to 18° blur spot size, 1.2 inch aperture, 0.828 inch focal length, 4.0 inch overall length, F/# of 0.690, and a 3.2 inch diameter.

11. A lens system comprising:

(a) a first lens, comprised of fused silica, having a first radius of curvature, r1= 2.68 inches, a second radius of curvature, r2= 0.922 inches, a first thickness, d1= 0.12 inches, and a first index of refraction, $n_1$= 1.4584;

(b) a second lens, comprising fused silica, having a third radius of curvature, r3= −6.025 inches, a fourth radius of curvature, r4=−1.427 inches, a second thickness, d2= 1.045 inches, and a second index of refraction, $n_d2$= 1.4584;

(c) a film, comprising polyvinyl alcohol of 2,3-DIHYDRO-5,7-DIMETHYL-1-H-1,4-DIAZEPINE PERCHLORATE 6-CHLORO-2,3-DIHYDRO-5,7-DIMETHYL-1-H-1,4-DIAZEPINE PERCHLORATE having a fifth radius of curvature, r5=∞, a third thickness, d3= 0.004 inches, and a third index of refraction, $n_d3$ = 1.48;

(d) a third lens, comprising a colored glass filter, having a sixth radius of curvature, r6=∞, a seventh radius of curvature, r7= ∞, a fourth thickness, d4= 0.3 inches, and a fourth index of refraction, $n_d4$= 1.54;

(e) a fourth lens, comprising fused silica, having an eighth radius of curvature, r8= 2.611 inches, a ninth radius of curvature, r9= −2.611, a fifth thickness, d5= 0.89 inches, and a fifth index of refraction, $n_d5$ = 1.4584;

(f) a fifth lens, comprising nickel sulfate, having a tenth radius of curvature, r10= 1.27 inches, an eleventh radius of curvature, r11=∞, a sixth thickness, d6= 1.07 inches, and a sixth index of refraction, $n_d6$ = 1.51;

(g) a window, comprised of fused silica, having a twelfth radius of curvature, r12=∞, a thirteenth radius of curvature, r13=∞, a seventh thickness, d7= 0.197 inches, and a seventh index of refraction, $n_d7$ = 1.4584; and, wherein each of said first to twelfth radii of curvature is centered about an axis line and wherein the lens system further has an 120° field of view, a 9° to 18° blur spot size, 1.25 inch aperture, 0.785 inch focal length, 4.45 inch overall length, F/# of 0.628, and a 3.1 inch diameter.

12. A lens system comprising:

(a) an optical housing;

(b) a plurality of optical elements mounted on the optical housing wherein the plurality of optical elements cooperate to transmit radiation only in a predetermined ultraviolet band and provide a compact lens system having a wide field of view with an F/# less than 1 wherein the compact lens system has an overall length of no more than 4.5 inches and an overall diameter of no more than 4 inches with a blur spot size ranging from 9 degrees to 18 degrees, and wherein the lens system further comprises a square image plane having a diagonal of at least 40 mm.

13. The lens system of claim 12 wherein the compact lens system has a field of view greater than 92 degrees.

14. The lens system of claim 13 wherein:

(a) the optical housing further comprises a first lens mount, a second lens mount, a first filter mount, a third lens mount, a fourth lens mount, and a window mount;

(b) the plurality of optical elements comprises a first lens mounted to the first lens mount wherein the first lens has a first lens optical axis, a second lens mounted to the second lens mount wherein the second lens has a second lens optical axis substantially coincident with the first lens optical axis, a first filter mounted to the first filter mount wherein the first filter has a first filter optical axis substantially coincident with the first lens optical axis, and a third lens mounted to the third lens mount wherein the third lens has a third lens optical axis substantially coincident with the first lens optical axis, a fourth lens mounted to the fourth lens mount wherein the fourth lens has a fourth lens optical axis substantially coincident with the first lens optical axis, wherein each the first lens, second lens, first filter, third lens and fourth lens cooperates optically to provide extremely wide angle, very large aperture, compact, solar blind, ultra-violet imaging.

* * * * *

UNITED STATES PATENT AND TRADEMARK OFFICE
CERTIFICATE OF CORRECTION

PATENT NO. : 5,504,618
DATED : April 2, 1996
INVENTOR(S) : John H. Hirs et al.

It is certified that error appears in the above-indentified patent and that said Letters Patent is hereby corrected as shown below:

Column 8, line 61, delete the word "Nominal" and replace it with:

-- The entrance aperture is defined as the diameter of the nominal --.

Column 9, line 6, delete the word "inches" and replace it with -- inches$^2$ --.

Column 9, line 11, delete the word "cose" and replace it with -- cos$\Theta$ --.

Column 9, line 21, delete the words "cos e" and replace them with -- cos$\Theta$ --.

Column 11, line 38, delete the word "$n_1$" and replace it with -- $n_d1$ --.

Column 11, line 51, delete the word "$n_4$" and replace it with -- $n_d4$ --.

Column 12, line 10, delete the word "$n_1$" and replace it with -- $n_d1$ --.

Signed and Sealed this

Sixth Day of August, 1996

Attest:

BRUCE LEHMAN

Attesting Officer     Commissioner of Patents and Trademarks